United States Patent [19]

Hanaki et al.

[11] Patent Number: 5,339,015
[45] Date of Patent: Aug. 16, 1994

[54] INTERFERENCE CHECKING METHOD AND APPARATUS FOR NUMERICAL CONTROL MACHINING TOOL

[75] Inventors: Yoshimaro Hanaki; Kyoichi Yamamoto, both of Niwa, Japan

[73] Assignee: Okuma Corporation, Nagoya, Japan

[21] Appl. No.: 969,965

[22] Filed: Nov. 2, 1992

[30] Foreign Application Priority Data

Nov. 7, 1991 [JP] Japan .................. 3-319788

[51] Int. Cl.⁵ ............................................. G05B 19/18
[52] U.S. Cl. ........................ 318/600; 318/565; 318/567; 318/569; 318/574; 364/474.2
[58] Field of Search ................ 364/474.2; 318/567, 318/568.1, 568.11, 568.15, 568.16, 568.17, 569, 573, 574, 600

[56] References Cited

U.S. PATENT DOCUMENTS

| | | | |
|---|---|---|---|
| 4,489,377 | 12/1984 | Mawyer et al. | 364/167 |
| 4,513,366 | 4/1985 | Munekata et al. | 364/167 |
| 4,706,187 | 11/1987 | Arai et al. | 364/191 |
| 4,720,796 | 1/1988 | Kishi et al. | 318/563 X |
| 5,060,544 | 10/1991 | Hanaki et al. | 82/1.11 |
| 5,079,713 | 1/1992 | Kawamura et al. | 364/474.2 |
| 5,146,410 | 9/1992 | Kawamura et al. | 318/573 X |
| 5,150,305 | 9/1992 | Sekikawa | 364/474.26 |

FOREIGN PATENT DOCUMENTS

64-48107 2/1989 Japan .
1-180602 7/1989 Japan .

Primary Examiner—Bentsu Ro
Attorney, Agent, or Firm—Wenderoth, Lind & Ponack

[57] ABSTRACT

A coordinate data converter converts plural shape data of the movable parts from a direction and of the parts that may interfere with the movable parts into the shape data of the three-dimensional coordinate system unique to the machining system, the number of structural shape elements of those parts being different from one another. A generator projects thus converted shape data on the three planes of said three-dimensional coordinate system; an arithmetic operator determines whether or not projected data overlap each other in each of the three planes, and a detector determines that an interference has occurred if the projection data on respective planes overlap and if projected data based on the shape data overlap in all of the three planes. Interferences can be thereby precisely checked in a short period of time even if a tool used for machining with an NC machine tool moves in a complicated manner or has a complex shape because it can store the shape of movable parts and of parts which may interfere with the movable parts including simple shapes to detailed shapes so as to permit the successive checking thereof.

8 Claims, 9 Drawing Sheets

TURRET
WORK + CHUCK

INTERFERENCE CHECKING METHOD AND APPARATUS FOR NUMERICAL CONTROL MACHINING TOOL

BACKGROUND OF THE INVENTION

1. Field of the Invention

The present invention relates to a method an apparatus which checks interference among parts operable with numerical control information in a numerical control machine tool.

2. Description of the Prior Art

In the numerical control (referred to as "NC" hereinafter) machine tool which is controlled by an NC apparatus operating by interpreting NC information, because tools, turrets, loaders and measurement devices are being operated simultaneously, it is highly important to check and avoid interference among moving parts or between a moving part and a static part. There has been proposed an apparatus for the tools where the operating range is limited within a two dimensional space such as a lathe, which apparatus checks interference among parts by defining in a two dimensional space the shapes of the tool, the turrets, the chuck, the work or the like and then checking the interference among thus defined shape data in two-dimensional space. There has also been proposed an apparatus for a system where the operating range of the tool extends into the three-dimensional space such as a machining center, which apparatus defines the shapes of the work or fixing jig on an X-Y plane and at the same time defines their thicknesses in a Z-direction, and checks the interference among thus defined shape data and Z-coordinate of the cutter tip of the tool virtually in the two-dimensional space.

Figure 1:
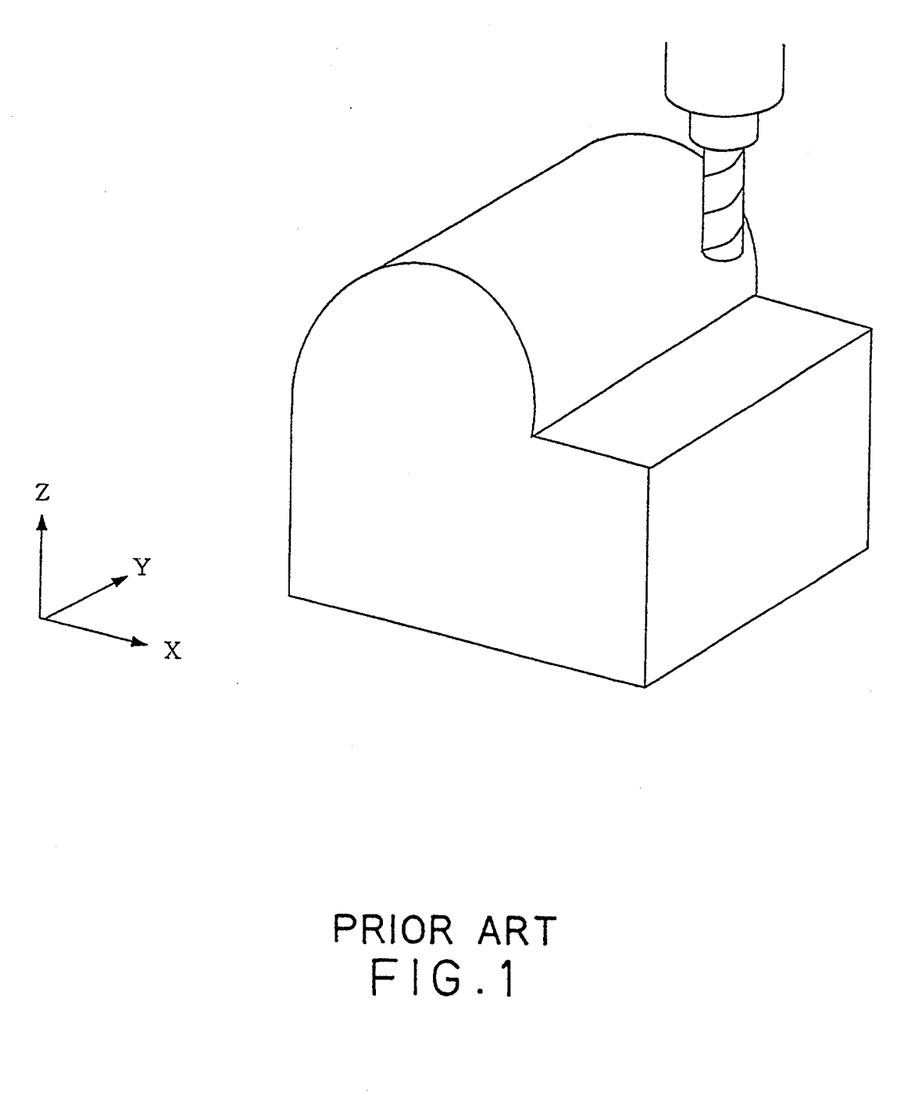
FIG. 1 is a perspective view to showing a model to explain the problems encountered in the prior art interference checking apparatus for the NC machine tool.

However, since the number of movable parts in the machining increases and their movements become complex, above mentioned apparatus are not quite satisfactory because of the following reasons. In a lathe, even though the movement of a tool is restricted in the two-dimensional space, it is impossible to check the interference which might occur between a loader and the tool or with a turret only in terms of the two-dimensional space. Moreover, in the machining center, as shown in FIG. 1, the shape of the work is not necessarily uniform in the Z-direction. When the shape of the work is complicated, precise checking of the interference is difficult.

In order to solve the above problems, there has been proposed an apparatus for strict interference checking in which the shape data of the three-dimensional coordinate system are projected on the three planes, each of which is orthogonal to the other and each of which includes two of the coordinate axes of the three-dimensional coordinate system, in which a determination is made as to whether or not the projected data in each of the planes overlap, and in which it is then determined that the interference has occurred if the projected data are overlapping in all the planes.

The above mentioned interference checking apparatus in an NC machine tool has to strictly define the shapes of moving and static parts in order to deal with complicated shapes of works or with complex movements of moving parts, taking a longer time in processing compared to the apparatus which only define simple shapes.

SUMMARY OF THE INVENTION

The present invention was contrived in view of the aforementioned problems and aims at providing an interference checking method and apparatus for an NC machine tool which can accurately check the interference in a shorter time and which can deal with complicated shapes or complex movements of the tool in machine operations of the NC machining tool.

According to one aspect of the present invention, for achieving the objects described above, there is provided an interference checking method and apparatus for a numerical control machine tool which comprises a storing means which stores plural shape data of parts movable with a numerical control information of the numerical control machine tool and of static parts that may interfere with said movable parts, the number of structural elements of said static parts being different from that of the movable parts, a converting means which converts the plural shape data of stored parts into shape data of three-dimensional coordinate system unique to said machining tool; a generating means which generates projection data by projecting said converted shape data on the three planes, each of which includes two coordinate axes of the three-dimensional coordinate system unique to said machining tool and each of which is orthogonal to one another; an arithmetic operating means which determines by an arithmetic operation whether or not the projection data on each of the planes overlap one another, and a detecting means which detects an interference if said arithmetic operating means determines in the affirmative and if the projection data based on the same shape data overlap on all the planes; wherein the method and apparatus repeats the steps of determining the presence/absence of said interference by starting from the projection data based on the shape data of the least number of structural elements to the projection data based on the shape data of the greatest number of structural elements until it is determined that no interference will occur.

The nature, principle and utility of the invention will become more apparent from the following detailed description when read in conjunction with the accompanying drawings.

DETAILED DESCRIPTION OF THE PREFERRED EMBODIMENTS

Figure 2:
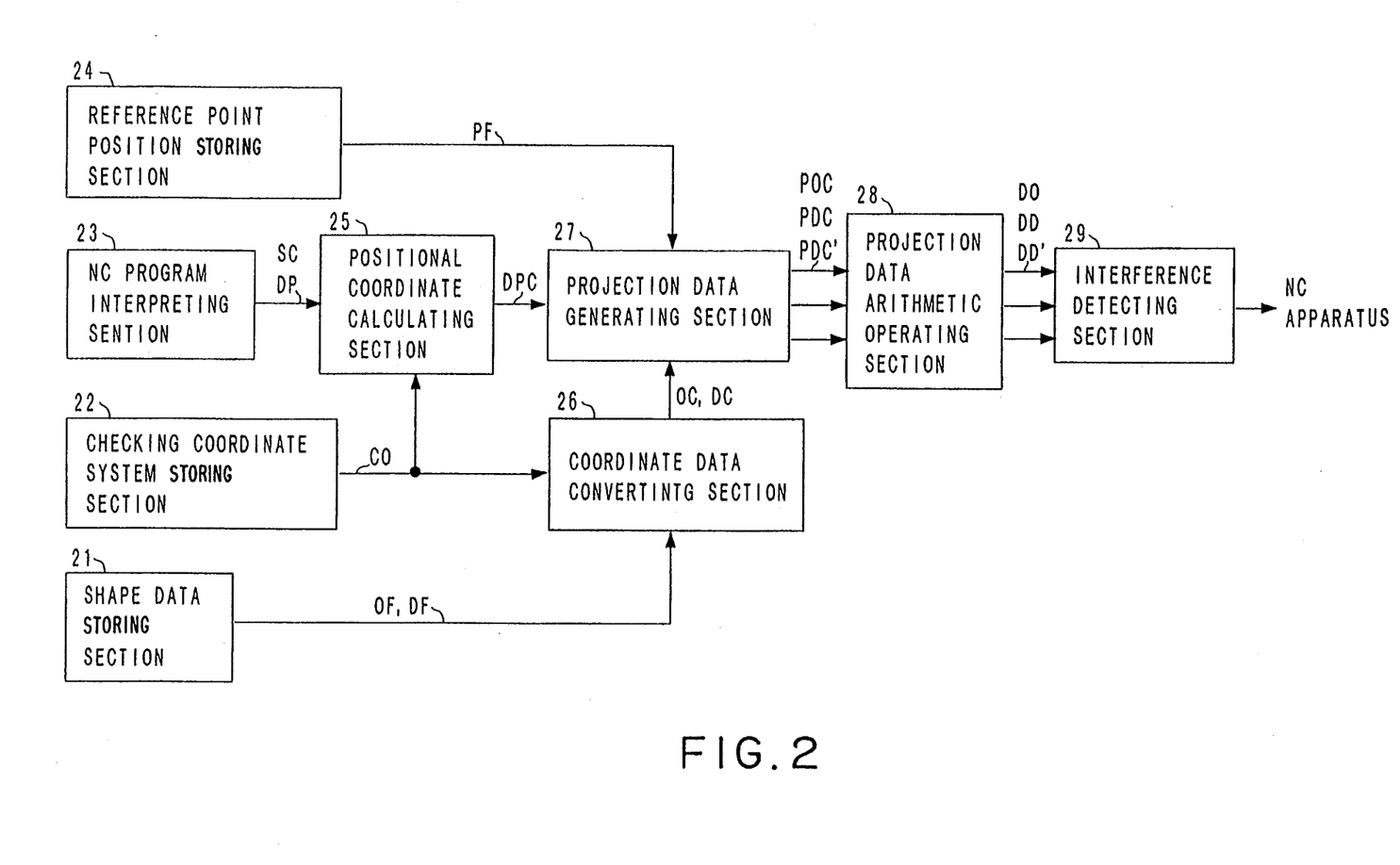
FIG. 2 is a block diagram to showing an embodiment of the interference checking apparatus for an NC machine tool according to the present invention.
Figure 3A:
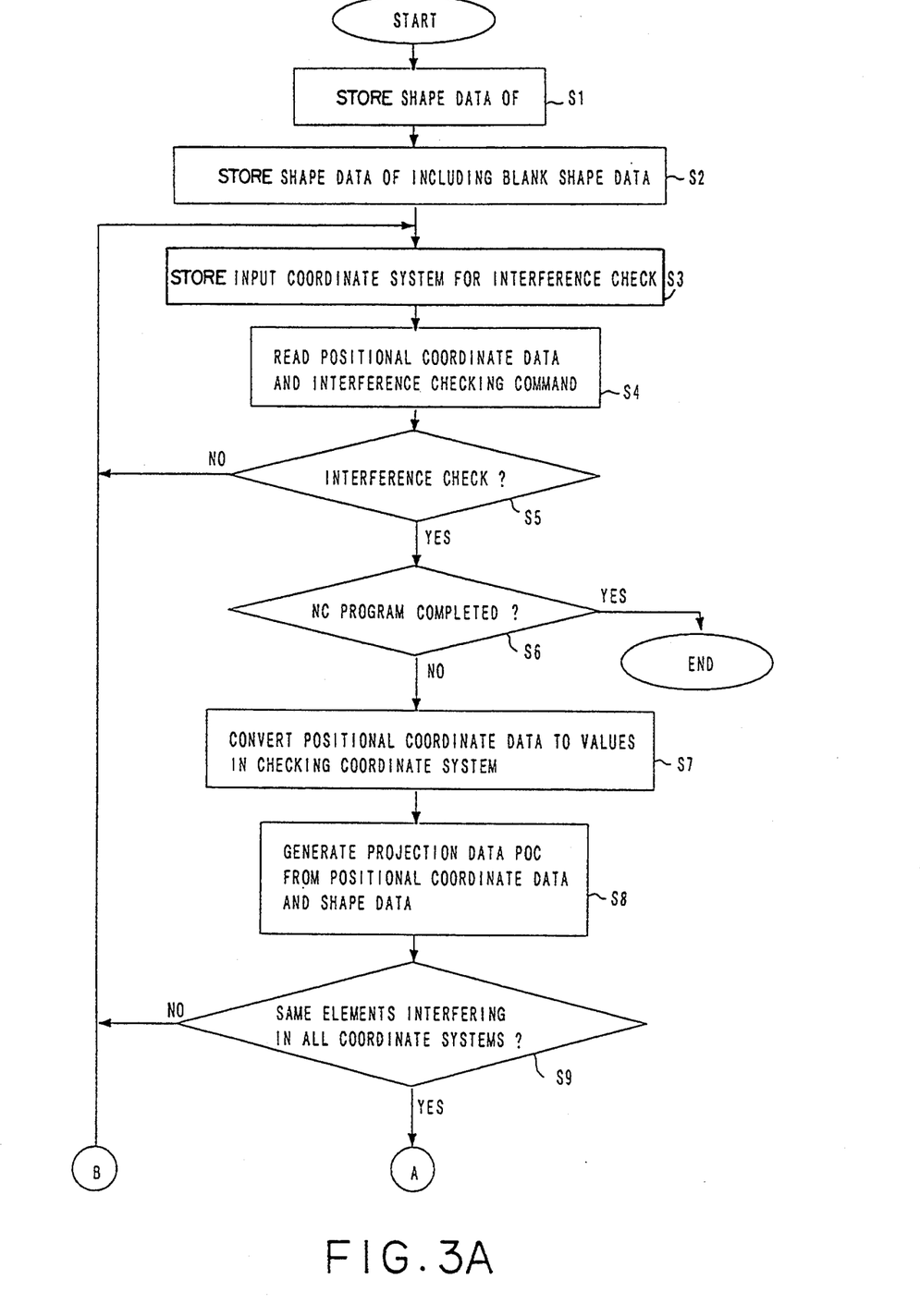
FIGS. 3A and 3B are flowcharts to showing an example of operation of the present invention.
Figure 3B:
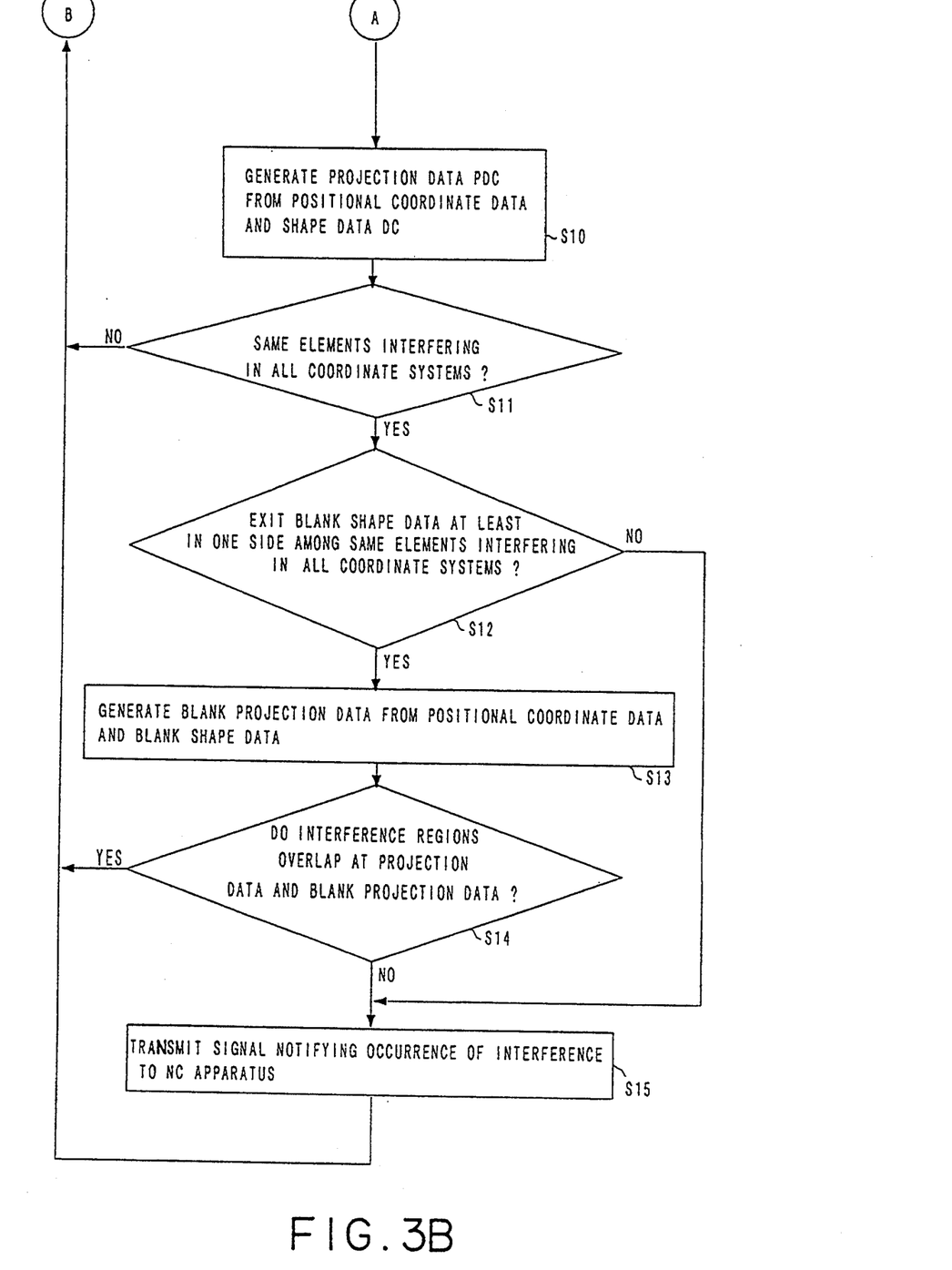
Figure 4:
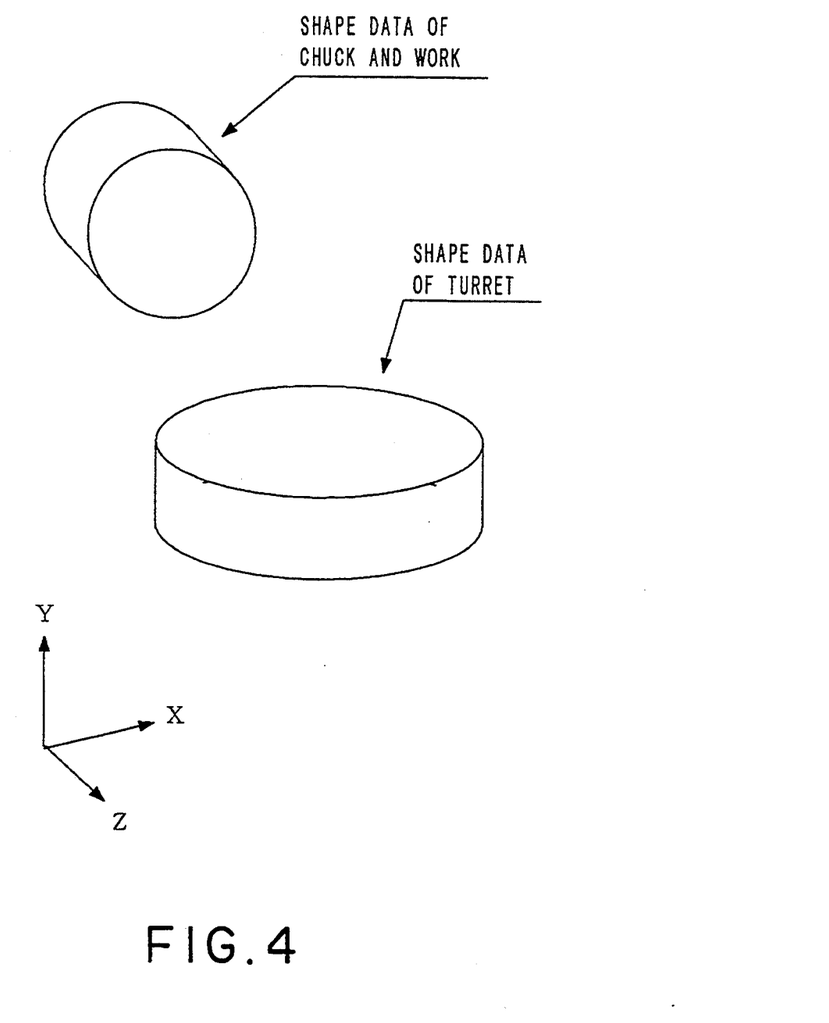
FIG. 4 is a perspective view to showing an example of the simplified shape data to be used in the present invention.
Figure 5:
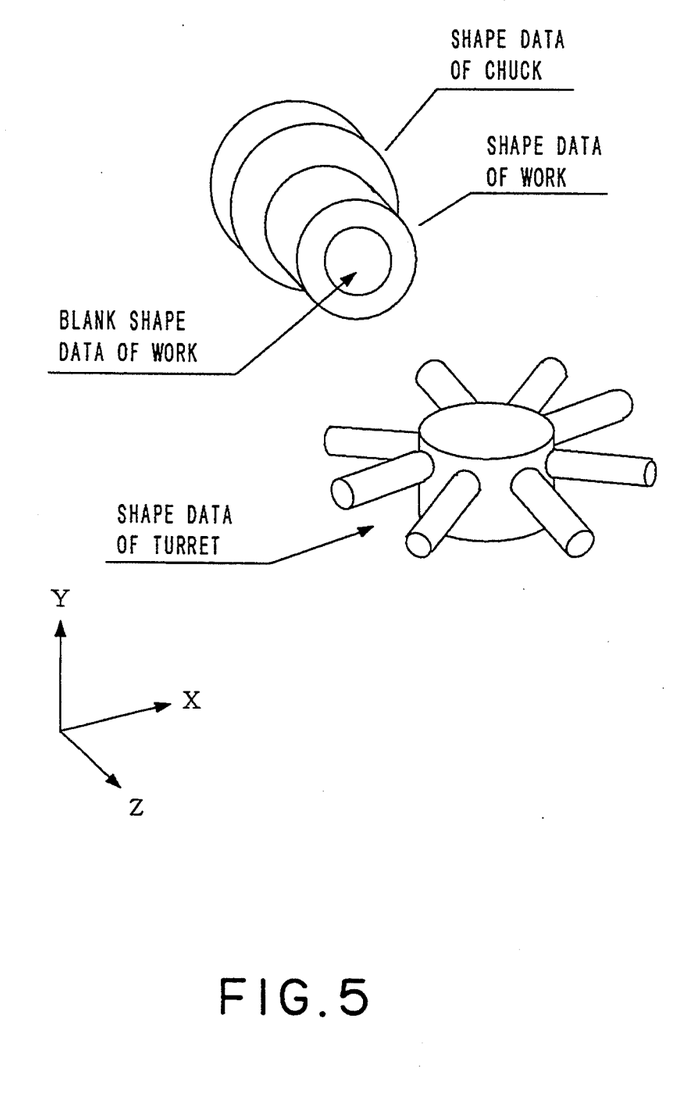
FIG. 5 is a perspective view to showing an example of the detailed shape data according to the present invention.

FIG. 2 is a block diagram showing an embodiment of an interference checking apparatus for an NC machine tool according to the present invention, and FIGS. 3A and 3B are flowcharts of the operation thereof. An operator stores in a shape data storing section 21 simplified shape data with less number of structural shape elements of a moving part as well as of parts which might interfere with the moving part, the shape data OF as shown in FIG. 4, and detailed shape data of a larger number of the structural shape elements thereof, the shape data DF as shown in FIG. 5 in the three-dimensional coordinate system for the respective parts (Steps S1 and S2). The operator further stores in a checking coordinate system storing section 22 the three-dimensional coordinate system unique to the NC machining tool which is the subject of the interference checking, for example, a program coordinate system (Step S3). Then, a positional coordinate calculating section reads in positional coordinate data DP and an interference checking command SC of the moving part such as a tool from an NC program interpreting section 23 (Step S4), and determines whether or not the shape to be checked for the interference is being checked for the interference as designated as well as whether or not the interference checking command SC is "ON" (Step S5).

If it is determined that the interference not being checked at Step S5, the procedure returns to the Step S4 to repeat process mentioned above, but if it is being checked for the interference, a determination is made as to whether or not an end code of the NC program has been read in by the positional coordinate calculating section 25 (Step S6). When such the end code of the NC program has been read in by the positional coordinate calculating section 25, all the processes end there, but if not, the positional coordinate data DP which has been read-in from the interpreting section 23 is converted to positional coordinate data DPC in a checking coordinate system CO which has been read-in from the checking coordinate system storing section 22 (Step S7). The respective shape data OF and DF which have been read-in from the shape data storing section 21 are respectively converted to shape data OC and DC of the checking coordinate system CO read-in from the checking coordinate system storing section 22 by a coordinate data converting section 26. If the checking coordinate system the is the program coordinate system, above mentioned conversion operation at the coordinate data converting section would not be necessary.

A projection data generating section 27 generates projection data POC of each of the planes of X-Y, Y-Z and Z-X based on the shape data OC read-in from the coordinate data converting section 26, the positional coordinate data DPC read-in from the positional coordinate calculating section 25 and the relative position PF of a reference point in the moving part shape data read-in from a reference point position storing section 24 (Step S8). By conducting an AND-operation of digitized image data, whether or not the projection data POC from the projection data generating section 27 are overlapping each other on each of the planes is determined by a projection data arithmetic operating section 28, and if they overlap on the plane, a combination DO of names of the structural shape elements in each of the planes is transmitted to an interference detecting section 29. The interference detecting section 29 determines whether or not the projection data POC are overlapping based on the same shape data on all the planes of X-Y, Y-Z and Z-X to thereby determine if an interference has occurred (Step S9). If it is determined that no interference has occurred because the projection data POC do not overlap based on the same shape data on all the planes, the process will return to Step S4 and the aforementioned operations are repeated.

Figure 6A:
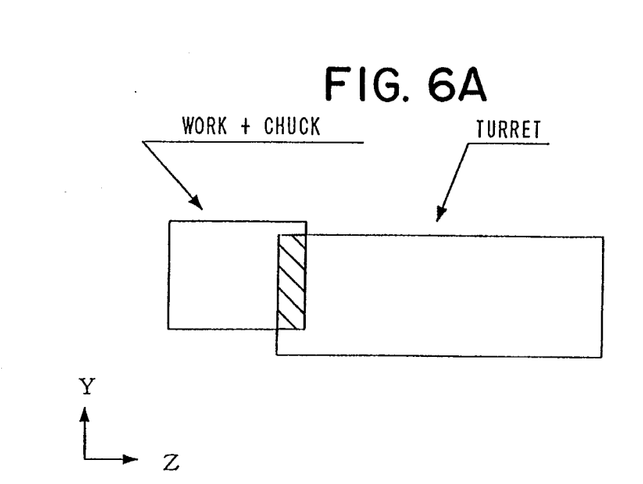
FIGS. 6A–6C are views to showing an example of the interference checking among shape data shown in FIG. 4.
Figure 6B:
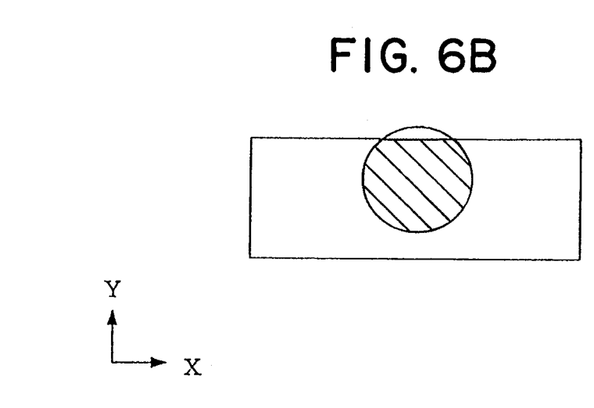
Figure 6C:
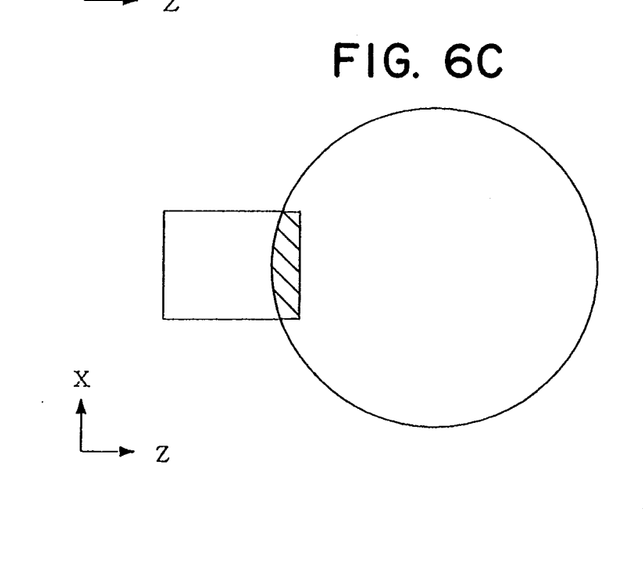

On the other hand, as shown in FIG. 6, if the projection data are overlapping based on the same shape data and the interference is occurring, projection data PDC in each of the planes of X-Y, Y-Z and Z-X are generated by the projection data generating section 27 based on the shape data DC read-in from the coordinate data converting section 26, the positional coordinate data DPC read-in from the positional coordinate calculating section 25 and the relative position PF of the reference point in the moving part position data read-in from the reference point position storing section 24 (Step S10). The projection data arithmetic operating section 28 determines by conducting the AND-operation of the digitized image data whether or not the projection data PDC are overlapping on each of the planes, and if they are overlapping, the combination of the names of the structural shape elements and the data DD of the overlapping portions are transmitted to the interference detecting section 29. The interference detecting section 29 determines whether or not an interference has occurred by determining if the projection data PDC overlap one another based on the same shape data on all the planes of X-Y, Y-Z and Z-X (Step S11). If it is determined that no interference has occurred because no projection data PDC based on the same shape data in any one of the planes overlaps, the procedure returns to Step S4 and above mentioned operations are repeated.

Figure 7A:
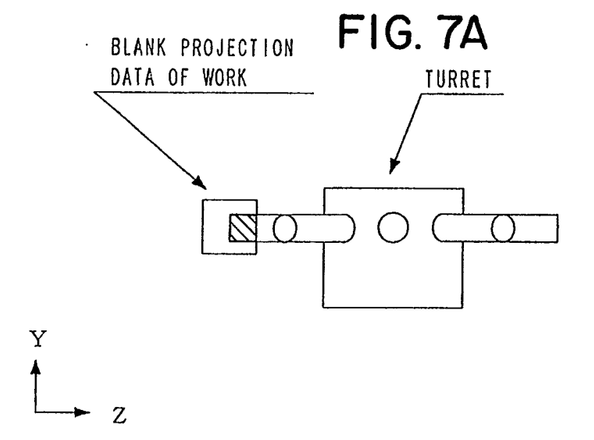
FIGS. 7A–7C are views to showing an example of the interference checking among shape data shown in FIG. 5.
Figure 7B:
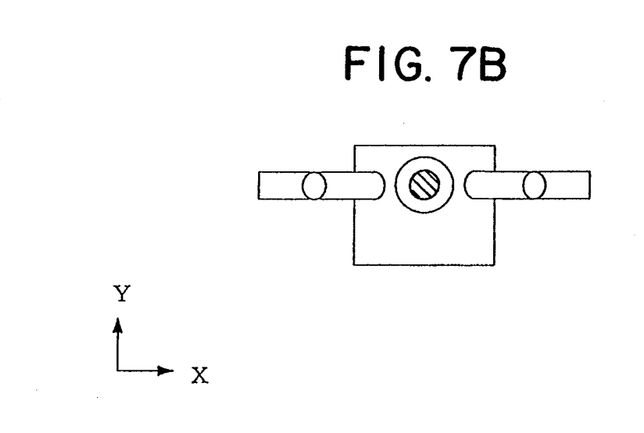
Figure 7C:
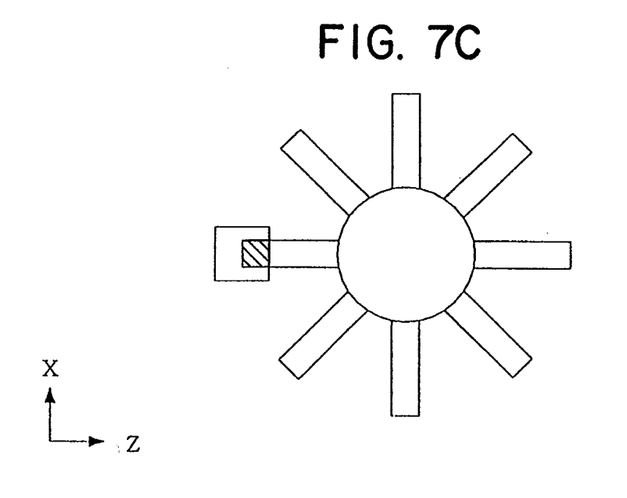

On the other hand, if the projection data based on the same shape data are determined to overlap in all the planes and the interference has occurred, as shown in FIG. 7, the projection data generating section 27 determines whether or not a blank shape data is present in the shape data DC read-in from the coordinate data converting section 26 (Step S12). If there is no such blank shape data present, the process advances to Step S15. In this embodiment as shown in figure, since there is a blank shape data present, blank projection data PDC' in each of the planes X-Y, Y-Z and X-Z are generated by the projection data generating section 27 based on the blank data, the positional coordinate data DPC read-in from the positional coordinate calculating section 25 and the relative position PF of the reference point in the moving part shape data read-in from the reference point position storing section 24 (Step S13). The projection data arithmetic operating section 28 determines by conducting the AND-operation of the digitized image data whether or not the blank projection data PDC' overlaps with the projection data PDC in each of the planes. If they overlap, the combination of the names of the structural shape elements for each plane and the data DD' of the overlapping portions are transmitted to the interference detecting section 29.

Figure 8A:
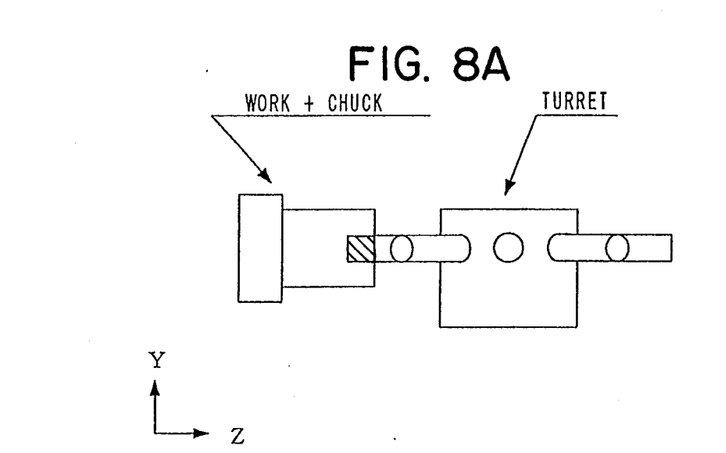
FIGS. 8A–8C are views to showing an example of the interference checking for a blank shape data shown in FIG. 5.
Figure 8B:
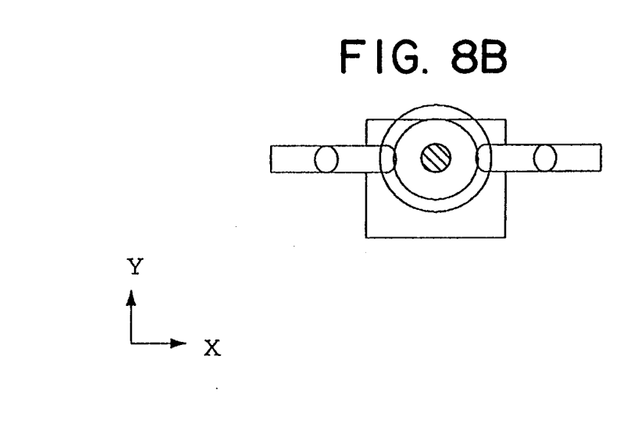
Figure 8C:
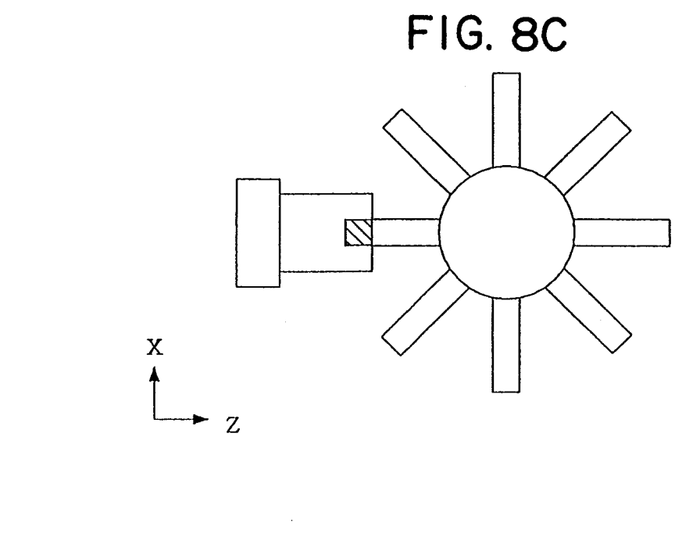

The interference detecting section 29 determines whether or not the blank projection data PDC' based on the same blank shape data overlap the projection data PDC based on the same shape data in all the planes of X-Y, Y-Z and Z-X and whether or not the data on overlapping parts of the blank projection data PDC' and the overlapping parts of the projection data PDC coincide with each other (Step S14), and as shown in FIG. 8, if the blank projection data PDC' based on the same shape data coincides with the projection data PDC based on the same shape data in all the planes, and further, if the data on the overlapping portion of the blank projection data PDC' coincides with the data of the overlapping portion of the projection data PDC, the procedure returns to Step S4 and the above mentioned operations are repeated.

On the other hand, if the blank projection data PDC' based on the same blank shape data and the projection data PDC based on the same shape data do not overlap or even if they do, if the data of the overlapping portion of the blank blank projection data PDC' and the data of the overlapping portion of the projection data PDC do not coincide with each other, than the interference detecting section 29 transmits a signal to notify an occurrence of interference to the NC apparatus (Step S15) and the procedure returns to Step S4 and the above mentioned operations are repeated.

In this embodiment, it is assumed that the NC program issues a command for an interference checking, designation of a shape data or command to switch on or off of interference checking may be conducted by a separate command system.

The processing after Step S4 in the loop may be conducted as one task in the time-sharing processing or conducted by an independent processor either before machining or during machining successively for the read out NC program.

As the interference checking apparatus for the NC machining system according to the present invention can precisely check interference even if the movements and the shape of tools and the like used in the NC machining system are quite complicated, the present invention apparatus can improve safety. Moreover, as the present invention apparatus conducts checking for detailed shapes only after an occurrence of possible interference is determined by checking simplified shapes, the processing time can be remarkably shortened to thereby greatly reduce the number of processing steps.

What is claimed is:

1. An interference checking method for a numerical control machine tool, comprising the steps of:

storing in a storing means, a plurality of shape data of machining parts, movable in accordance with numerical control information of the numerical control machine tool;

storing in the storing means, the data of static parts that may interfere with said movable parts, wherein the number of structural elements of said static parts is different from that of said movable parts;

converting in a converting means, the plurality of shape data stored in said storing means into three-dimensional orthogonal data unique to said machine tool;

generating in a generating means, projection data by projecting said three-dimensional orthogonal data onto three-orthogonal planes, each plane including two orthogonal coordinate axes;

determining by an arithmetic operation in an arithmetic operating means, whether or not the projection data on each plane overlap one another;

detecting an interference in a detecting means, if the arithmetic operating means determines that the projection data of one plane overlaps the projection data of all other planes;

repeating the determining step and the detecting step for all movable parts, starting from the movable part having the least number of structural elements until the completion of the steps for the movable part having the greatest number of structural elements, thereby completing the interference check.

2. An interference checking method for a numerical control machine tool as recited in claim 1, wherein blank portions of said parts are stored as blank shape data in said storing means; and wherein the stored blank shape data is converted by said converting means and said generating means to generate blank projection data for each of said planes, and then a determination is made as to whether or not they overlap said projection data based on the shape data with the greatest number of structural shape elements, and if they are determined to be overlapping by said arithmetic operating means and if said projection data based on the same blank shape data fail to overlap said blank projection data based on the same blank shape data in all of the planes, said detecting means determines that an interference has occurred.

3. An interference checking method for a numerical control machine tool, comprising the steps of:

storing in a storing means, a plurality of shape data groups which represent a set of machining pars, movable in accordance with numerical control information of the numerical control machine tool and static parts that may interfere with said movable pars and having a different number of structural elements;

converting in a converting means, the plurality of shape data groups stored in said storing means into three-dimensional orthogonal data unique to said machine tool;

generating in a generating means, projection data by projecting said three-dimensional orthogonal data onto three-orthogonal planes, each plane including two orthogonal coordinate axes;

determining by an arithmetic operation in an arithmetic operating means, whether or not the projection data on each plane overlap one another;

detecting an interference in a detecting means, if the arithmetic operating means determines that the projection data of one plane overlaps the projection data of all of the other planes;

repeating the determining step and the detecting step for the plurality of stored shape data groups, starting from the shape data group having the least number of structural elements until the completion of the steps for the shape data group having the greatest number of structural elements, thereby completing the interference check.

4. An interference checking method for a numerical control machine tool as recited in claim 5, wherein blank portions of said parts are stored as blank shape data in said storing means; and wherein the stored blank shape data is converted by said converting means and said generating means to generate blank projection data for each of said planes, and then a determination is made as to whether or not they overlap said projection data based on the shape data with the greatest number of structural shape elements, and if they are determined to be overlapping by said arithmetic operating means and if said projection data based on the same blank shape data fail to overlap said blank projection data based on the same blank shape data in all of the planes, said detecting means determines that an interference has occurred.

5. An interference checking apparatus for a numerical control machine tool comprising:
- a storing means for storing a plurality of shape data of machining parts, movable in accordance with numerical control information of the numerical control machine tool;
- a storing means for storing the data of static parts that may interfere with said movable parts, wherein the number of structural elements of said static parts is different from that of said movable parts;
- a converting means for converting the plurality of shape data stored in said storing means into three-dimensional orthogonal data unique to said machine tool;
- a generating means for generating projection data by projecting said three-dimensional orthogonal data onto three-orthogonal planes, each plane including two orthogonal coordinate axes;
- an arithmetic operating means for determining by an arithmetic operation whether or not the projection data on each plane overlap one another; and
- a detecting means for detecting an interference if the arithmetic operating means determines that the projection data of one plane overlaps the projection data of all other planes;
- wherein the determining step and the detecting step by said arithmetic operating means and said detecting means are repeated for all movable parts, starting from the movable part having the least number of structural elements until the completion of the steps for the movable part having the greatest number of structural elements, thereby completing the interference check.

6. An interference checking apparatus for a numerical control machine tool as recited in claim 5, wherein said storing means stores blank portions of said parts as blank shape data and wherein said converting means and said generating means convert said stored blank shape data into blank projection data for each of said planes and then determine whether or not they overlap said projection data based on the shape data with the greatest number of structural shape elements, and if said arithmetic operating means determines that they are overlapping and if said projection data based on the same shape data fail to overlap said blank projection data based on the same blank shape data in all of the planes, then said detecting means determines that an interference has occurred.

7. An interference checking apparatus for a numerical control machine tool comprising:
- a storing means for storing a plurality of shape data groups which represent a set of machining parts, movable in accordance with numerical control information of the numerical control machine tool and static parts that may interfere with said movable parts and having a different number of structural elements;
- a converting means for converting the plurality of shape data groups stored in said storing means into three-dimensional orthogonal data unique to said machine tools;
- a generating means for generating projection data by projecting said three-dimensional orthogonal data onto three-orthogonal planes, each plane including two orthogonal coordinate axis;
- an arithmetic operating means for determining by an arithmetic operation whether or not the projecting data on each plane overlap one another; and
- a detecting means for detecting an interference if the arithmetic operating means determines that the projection data of one plane overlaps the projection data of all of the other planes;
- wherein the determining step and the detecting step by the arithmetic operating means and detecting means are repeated for the plurality of stored shape data groups, starting from the shape data group having the least number of structural elements until the completion of the steps for the shape data group having the greatest number of structural elements, thereby completing the interference check.

8. An interference checking apparatus for a numerical control machine tool as recited in claim 7, wherein said storing means stores blank portions of said parts as blank shape data and wherein said converting means and said generating means convert said stored blank shape data into blank projection data for each of said planes and then determine whether or not they overlap said projection data based on the shape data with the greatest number of structural shape elements, and if said arithmetic operating means determines that they are overlapping and if said projection data based on the same shape data fail to overlap said blank projection data based on the same blank shape data in all of the planes, then said detecting means determines that an interference has occurred.

* * * * *